Jan. 28, 1964  J. LUND  3,119,479
BREAKAWAY TYPE ANTI-REVERSE FEED-BACK DEVICE
Filed Sept. 21, 1961  2 Sheets-Sheet 1
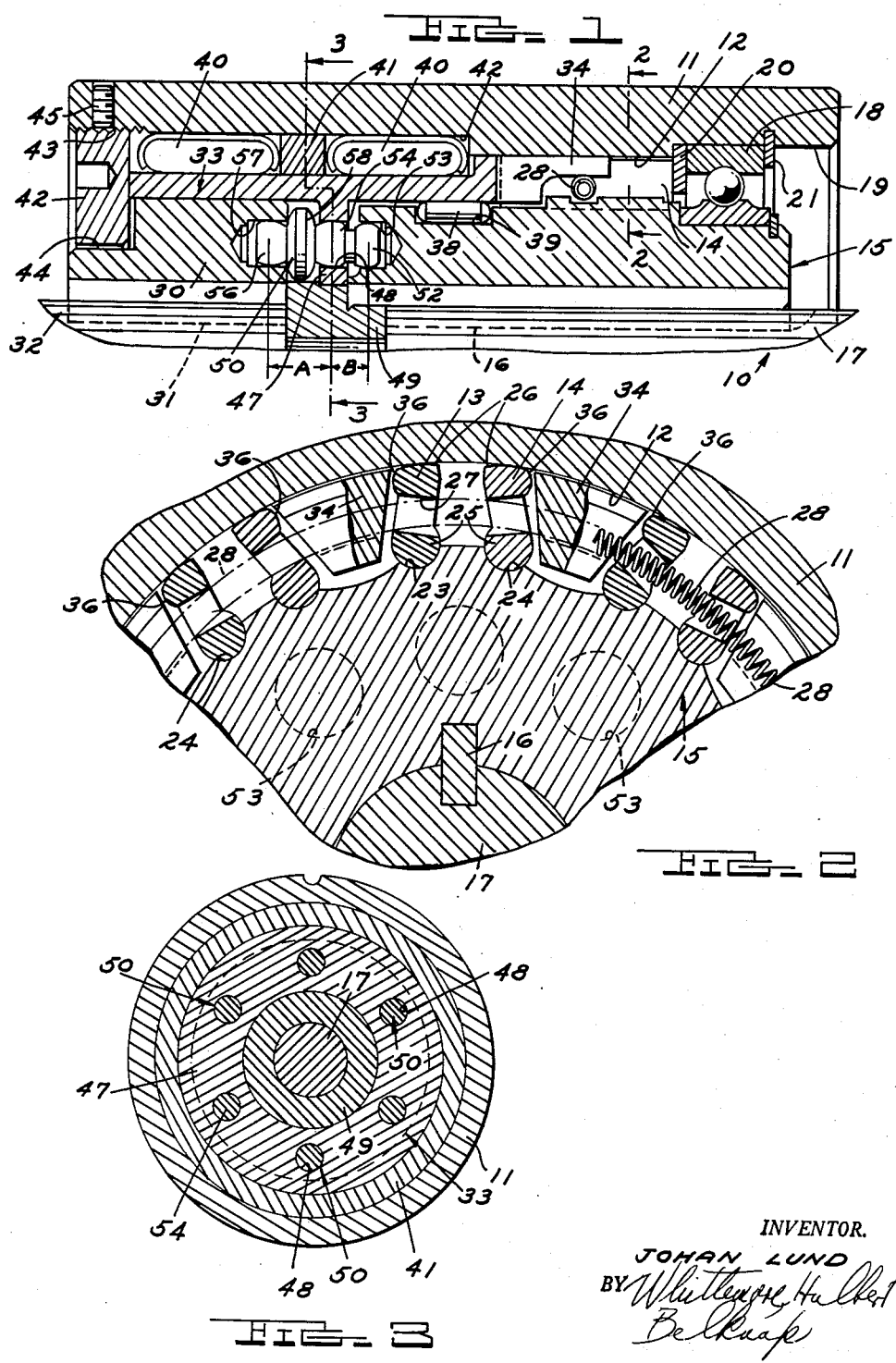
INVENTOR.
JOHAN LUND

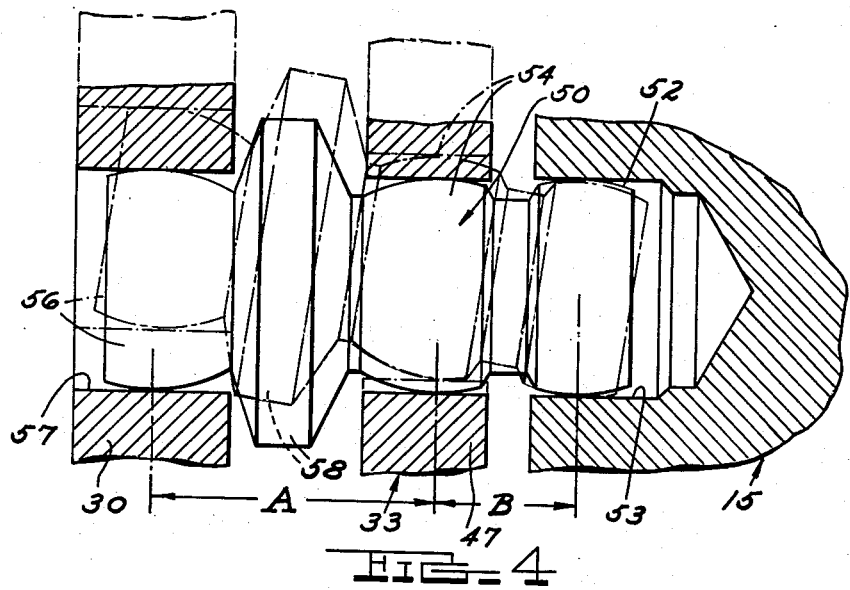
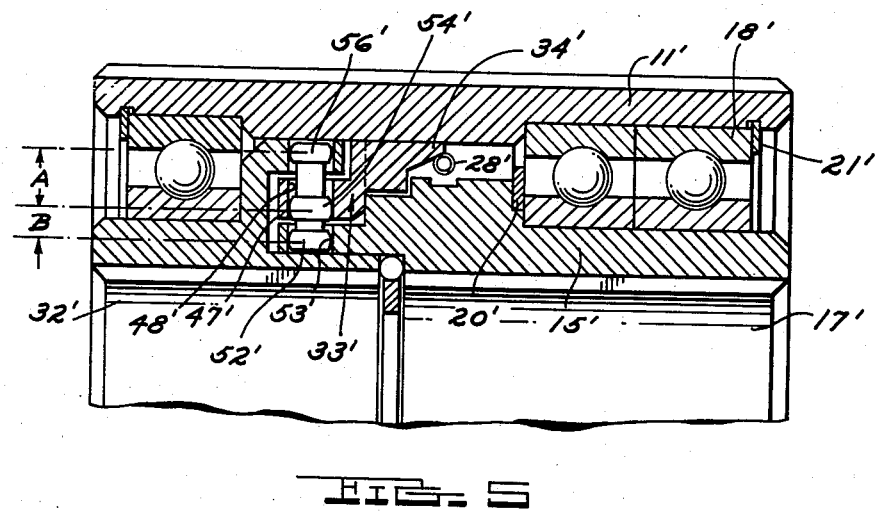

United States Patent Office 3,119,479
Patented Jan. 28, 1964

3,119,479
BREAKAWAY TYPE ANTI-REVERSE
FEED-BACK DEVICE
Johan Lund, Detroit, Mich., assignor to Formsprag Company, Warren, Mich., a corporation of Michigan
Filed Sept. 21, 1961, Ser. No. 139,783
11 Claims. (Cl. 192—8)

The present invention relates to improvements in a two-directional power transmission device of the anti-reverse feed-back type, such as is the subject matter of my copending application, Serial No. 84,386, filed January 23, 1961, which is a continuation-in-part of an earlier filed application, Serial No. 795,974, filed February 27, 1959, now abandoned. Those applications are directed to a power transmission unit capable of transmitting torque in both rotative directions from an input member to an output member, and capable of preventing any feedback from the driven equipment to the power source.

In such a unit, driving torque may be transmitted at high speeds in both rotative directions without relative slippage, yet with instantaneous positive locking against feedback from the driven to the driver in either rotative direction. In one of its adaptations, the invention of the identified applications, upon which the present application proposes an improvement, incorporates its principles in a bi-directional torque transmitting device, pure and simple, while in other embodiments the principles of the invention are applicable in a device to transmit torque from dual, relatively high speed and relatively low speed power sources, with the high speed source overrunning the low speed source when desired, as originally shown and described in my application, Serial No. 84,386. Similarly, the invention is applicable to various other types of two-way power transmission units, such as a two-way overrunning clutch, also in a single revolution clutch, a torque sensing and limiting mechanism, and the like. However, in the interest of simplicity, the invention is shown as applied in a simple, two-way back-stopping or anti-reverse feed-back unit, modified as here proposed.

Generally considered, and as illustrated and described in my pending applications referred to above, as applied to a two-way back-stopping device the unit comprises a fixed annular race arranged concentrically of a rotative race member driven from a power shaft or like rotative source, a complement of sprags arranged in opposing pairs, whereby when one sprag of each pair is operated to transmit torque from the driving source to the rotative member, the other sprag of the pair will simply slide upon the surface of the fixed race member, the first named sprag of the pair having been preliminarily tilted and disengaged from position for wedging engagement with the outer race by means of a finger actuated by the driver member. However, upon the application of feedback torque to the driven or output member of the unit, one of the two sprags, depending upon the direction of attempted feedback, will wedgingly engage the fixed race instantaneously to halt power transfer to the driving member or source.

It happens that, under engagement of the sprags there is a slight amount of torsional windup set up between the output side and the fixed outer race. This condition exists when the device is performing its function of backstopping a load, i.e., of preventing reverse feedback from the load to the input side; and it requires the application of a slight but noticeable amount of force to break the wedged connection of sprags and outer race.

It is therefore a general object of the present invention to provide an improved anti-reverse feed-back device, whether employed as a simple backstopping device or whether incorporated in a clutch of one sort or another, in which simple provision is made to facilitate the action of the device in coming into load driving engagement, by minimizing the amount of force needed to be exerted by the driving member to overcome the torsional windup referred to, when the sprags are wedgingly engaged with the relatively fixed member, upon resumption of the drive after backstopping a load. There thus results an increase in efficiency of operation due to increasing the amount of available torque to be instantaneously transmitted from the input side to the output.

More specifically, it is an object of the invention to provide a power transmission mechanism of the sprag type, bi-directional in transmitting torque to an output member as well as in preventing reverse drive from the mechanism, in which the application of force from certain control fingers on the power input member of the device, in a manner to tilt corresponding sprags of the oppositely oriented pairs in freeing such sprags from their wedged, load backstopping engagement with the outer fixed race, is benefited by a mechanical advantage, enabling the sprags to be instantly disengaged from the fixed race by a minimum application of actual power from the input member itself. This minimizes the waste of actual available power in bringing the fixed sprag control fingers into their final driving engagement with the sprags, in which the output member is driven through the agency of the sprags in the desired direction, corresponding other fingers of the pairs slidably overrunning the outer fixed race surface as this takes place.

Still more specifically, it is an object of the invention to provide a device in which the mechanical advantage referred to above is obtained by employing a power input and drive unit of two-part construction, including a finger-bearing, sprag-engaging member, an input member proper which is drivingly connected to a power shaft or source, and a series of power multiplying pins or pintles which operatively connect the dual input members with one another and with an inner driven member or race of the device. In this construction, the pintles in question are fulcrumed upon the last named output member (the latter being fixed locked at this time in performing its function of backstopping as described above). The arrangement is such that, upon application of a relatively slight driving torque to the power input member proper from its drive shaft or source, the finger-carrying member is angularly shifted through the agency of the power multiplying pins referred to; and, since the last mentioned member is engaged at a point between the pin fulcrum point and the point of application of torque to the pins by the power input member, in the manner of a second class lever, there is available for shifting the finger-bearing member a mechanical advantage equal to the distance between the points of the pintle engaged by the power input member and finger-bearing member, divided by the smaller distance between the points of the pintle engaged by the finger-bearing member and the power output member.

Another specific advantage is to provide bidirectional torque transmitting devices of the sprag type, characterized by all of the advantages of sprag mechanisms in point of simplicity, instant operation and reliability, which is extremely compact in regard to the force multiplying pintle means as operatively connected to the two-part power input member and the sprang-engaged output member or race. Thus, in one embodiment of the invention there are a plurality of the pintles disposed with their length paralleling the axis of the power input and output members, these pintles having fulcrum engagement at one end with the power output member and at the other end with the power input member, being received in axially aligned recesses of said respective members, and are medially journaled in apertures of a radially extending internal flange of the finger-bearing member, for the application of the multiplied power advantage referred to above. In alternative manner, the pintles are arranged to extend radially, with opposite ends thereof received in radially extending recesses of the driving or input and output members, respectively, again with a medial journal in a recess of the finger-carrying member for the mechanical advantage desired. In both embodiments the device permits the disengagement of the sprags from the fixed race with a minimum erpenditure of power from the input member or shaft of the mechanism.

The foregoing as well as other objects will become more apparent as this description proceeds, especially when considered in connection with the accompanying drawings illustrating the invention, wherein:

FIG. 1 is a fragmentary view in longitudinal axial section through a unit in accordance with a preferred embodiment of the invention, utilizing axially disposed power multiplying pintles for the purposes referred to above;

FIG. 2 is an enlarged scale fragmentary view in vertical cross section along a line corresponding to line 2—2 of FIG. 1;

FIG. 3 is a view in transverse section on line 3—3 of FIG. 1;

FIG. 4 is an enlarged scale fragmentary view, in section similar to that of FIG. 1, illustrating in solid and dot-dash lines the operation of the preferred embodiment in securing the desired mechanical advantage of force application overcoming torsional windups, in accordance with the principle of the invention; and FIG. 5 is a fragmentary view in longitudinal section similar to FIG. 1, showing an alternative embodiment of the invention in which radially disposed force multiplying pintles are employed.

Referring to FIGS. 1 through 4, the reference numeral 10 generally designates the improved breakaway type anti-reverse feed-back device of the invention, being shown in these figures as a backstopping device, pure and simple. In such an adaptation, the device 10 includes a fixed cylindrical outer race member 11 providing an internal cylindrical race surface 12, with which sets of oppositely oriented pairs of sprags 13, 14 are adapted to have wedging engagement, respectively, to prevent reverse feedback of power from the output side to the input side of the device 10, in one direction or another, as fully described in my copending applications referred to above.

The reference numeral 15 generally indicates an inner output race or member of the device, which is keyed or splined at 16 to a power output shaft 17. Output member 15 has a ball bearing 18 rotatably journaling the right-hand end of the same, as viewed in FIG. 1, in a counterbore 19 of fixed outer race 11, with snap rings 20, 21 holding the bearing in place.

As shown in FIG. 2, inner race 15, or output member, is formed on its outer surface to provide successive pairs of recesses 23, 24 of roughly semi-circular cross section extending axially thereof, in which recesses the approximately semi-spherical radially inner ends 25 of the respective sprags 13, 14 are received for tilting movement. As described in my copending applications referred to above, the sprags 13, 14 have radially outer wedging surfaces 26 of similar cam-like contour, but arranged oppositely of one another in reference to the direction of rotation of inner race or power output member 15.

Each of the sprags is provided with a hole 27 extending circumferentially therethrough at its axial midpoint, which holes receive a coiled garter spring 28 acting upon the respective sprags 13, 14 of each opposed set in a direction to wedgingly engage the sprag surfaces 26 with the race surface 12 of fixed outer race member 11, in a well known manner. Thus, should the load normally driven by output member 15 tend to exert a torque on the latter in the clockwise direction, as viewed in FIG. 2, all corresponding sprags 13 of the several pairs will instantaneously seize the outer race surface 12, being constantly urged thereagainst by garter spring 28; and the torque will be transmitted to the fixed race 11 without reverse feedback through device 10. Should the torque effect be in the opposite, counterclockwise direction, the sprags 14 exert the same backstopping action on the device.

As indicated above, in accordance with the present invention, two-part input means are provided for the drive of the output member 15 through the agency of the sets or pairs of sprags 13, 14. One part of such means comprises a power input sleeve member or operator 30 which is keyed or splined at 31 to a power input shaft 32 coaxial with the output shaft 17; and the other part of the power input means comprises an elongated cylindrical sleeve-like actuator member 33 telescoped over the operator member 30, as well as over the output member 15, as shown in FIG. 1, and provided at its end overlying member 15 with a plurality of equally spaced sprag control and drive fingers 34, similar to the provisions illustrated and described in my copending applications referred to above. As thus described, these fingers extend axially into the circumferential spaces between successive pairs of sprags 13, 14, separating these respective sprag sets from one another. As shifted circumferentially, through the agency of the force-multiplying provisions, by the input sleeve operator member 30, the fingers 34 will first engage one set of sprags 13 or the other set 14, depending upon the direction of angular shifting movement of the sleeve actuator member 33 carrying fingers 34, and, following a very few degrees of such shift, first contacts the sprag at a heel point 36 adjoining its wedging surface 26, tilting the sprag sufficiently to disengage the last named surface from fixed outer race surface 12, following which the radially inner end of the finger 34 will engage the same sprag at its semi-cylindrical inner portion 25, thus effecting a positive driving engagement from the finger 34 through the sprag with the inner race or power output member 15, into which the sprag portion 25 is socketed at the recess 23. The action is in all respects, in so far as the fingers 34 and sprags 13 or 14 are concerned, identical with the action illustrated and described in my copending applications referred to above so that further detailed explanation is not in order.

The fingers 34 are received within the outer race surface 12 with slight clearance, and the actuator member 33 carrying these fingers is journaled by roller bearings 38 upon the output member 15, such bearings being received in an annular groove 39 of the last named member. Finger-bearing member 33 is provided with further roller bearings 40, separated by an annular spacer 41 within an annular counterbore 42 of the fixed outer race 11; and the assembly of finger member 33 and input drive member 30 proper is held in place by a cap ring 42 threaded at 43 within the fixed outer race and between the latter and an annular shoulder 44 of power input member 30, the cap 42 serving as a retainer to hold sleeve member 33 in place. A set screw 45 threaded in the outer race member 11 is employed to lock the cap member 42 in a finally adjusted position.

In accordance with the invention, the finger-bearing member 33 is provided with an annular, radially inwardly extending flange 47 integral therewith; and, as best shown in FIG. 3, this flange is provided with a plurality of equally spaced holes 48 extending axially therethrough, shown as being six in number. The inner cylindrical surface of flange 47 is shown as piloted on an annular plug member 49, best shown in FIG. 1; and the holes 48 receive the power multiplying levers or pintles 50, by which force applied to the power input member 30 proper is transferred in augmented degree to the fingers 34, for the purpose of angularly shifting the latter in the control and drive of the sprags 13, 14, as referred to above.

Each lever or pintle is provided with a rounded forward nose 52 having a fulcrumed reception in an axially extending recess 53 opening rearwardly of the power output member 15. Each pintle also has an intermediate rounded portion 54 received in one of the holes 48 of the annular flange 47 of member 33, to the end that the pintle 50, as fulcrumed in the recess 48 of output member 15, the latter being fixed when operation takes place, will be able to exert a shifting force upon the member 30 at its flange 47. The pintle is formed to provide a rear, rounded terminal portion 56, which is received in a forwardly opening recess of the power input member or sleeve 30; and the rounded portions 54, 56 are separated by an integral enlargement 58, which serves as a spacer facilitating and maintaining the positioning of the lever or pintle 50 axially in relation to the output member 15, the flange 47 of member 33 and the input member 30 of the device.

It is thus seen that, in operation, and assuming that driving in one direction or another is to be resumed following backstopping, in which one set or the other of the sprags 13, 14 are wedged against the fixed outer race surface 12, the rotation of member 30 in the intended direction will, since pintle 50 has a fixed fulcrum in the recess 53 of power output member 15, cause each of the pintles 50 to be rocked about that fulcrum under force applied to the rear rounded end portion 56. This, of course, causes the intermediate rounded pintle portion 54 to engage and shift the finger-bearing member 33 a slightly lesser angular extent, but under magnified force, due to the arm ratio $A/B$ represented by the quotient of the distance A between the points at which pintle portion 56 engages input member 30 and the point at which its portion 54 engages flange 47, divided by the distance B between the last named point and the point at which its forward rounded portion 52 engages power output member 15. Torsional windup in shifting the sprags from wedged to free position is greatly facilitated by a mechanical advantage which may amount to as much as two to one, depending upon the particular design of the pintle 50.

The relationships are shown in magnified scale in FIG. 4, in which a pintle 50 is shown in solid line in its initial position, the sprags being wedged against the fixed race, and in dot-dash line in its operated position to shift the finger carrying member 33 and tilt the sprags out of wedged position.

FIGS. 1-3 show the lever elements or pintles arranged to extend longitudinally and generally parallel to the common axis of the drive sleeve member 30, the finger-bearing member 30 and the output member 15. This is an arrangement very compact in the radial sense; but for one offering equal compactness in the axial direction the combination shown in FIG. 5 is referred to. In this mechanism parts and relationships corresponding to those of FIGS. 1-3 are, for simplicity, designated by corresponding reference numerals, primed, and since the action is in general the same as that described above, further description in detail is avoided.

In this arrangement the force multiplying levers or pintles 50′ are arranged in a circumferentially spaced series to act in a radial plane. The finger-bearing sleeve 33′ is considerably shortened axially as compared with the sleeve 33 of the first embodiment, and has an integral annular, axially extending shoulder or flange 47′ provided with the pintle receiving openings 48′.

Similarly, the pintle fulcruming openings 53′ of output member 15′ and the openings 57′ of driver member or sleeve 30′ are disposed radially; and the force exerted by the last named member to shift the ends 56′ of levers or pintles 50′ is multiplied by the factor $A/B$, as applied at member 33′, to apply force to fingers 34′ to neutralize the wedging of sprags 13′ or 14′ against the race 12′. In other respects the embodiment of FIG. 5 differs from that of FIGS. 1-3 only in certain standard bearing provisions not particularly germane to the invention.

A torque transmitting mechanism is provided which, in either illustrated embodiment, or others equivalent thereto which will occur to those skilled in the art, increases efficiency in returning a sprag clutch-type mechanism from a condition for one of its operating phases to that for another. A simple force multiplying lever arrangement couples an input member to a control sleeve member through a fulcrumed connection to a further locked member (or its equivalent in an overrunning clutch adaptation), in a most compact and economical manner.

What I claim as my invention is:

1. A control device of the type described comprising a fixed locking member, a rotative member, said members having generally coaxial annular surfaces in axially telescoped, radially spaced relation to one another, the surface of one of said members having a cylindrical contour and the surface of the other member being provided with rounded sockets opening radially toward said first named surface, an actuator member pivoted coaxially of said fixed and rotative members, a set of sprags each having a rounded radial end portion and an opposite radial wedging portion, said portions being respectively disposed in sockets of said surface of said other member and in engagement with said surface of said one member, spring means urging different sprags of the set in opposite directions in the sockets thereof for wedging engagement with said surface of said one member to prevent rotative movement of said rotative member, said actuator member having elements fixed thereon and engageable with corresponding sprags of the set upon pivotal movement of the actuator member relative to the fixed and rotative members, thus to tilt said sprags in said sockets and out of said wedging engagement with said surface of said one member and permit said rotative movement of said rotative member, an operator, and means operating said actuator member from said operator with a mechanical advantage to facilitate said last named tilting of the sprags.

2. A control device of the type described comprising a fixed locking member, a rotative member, said members having generally conical annular surfaces in axially telescoped, radially spaced relation to one another, the surface of one of said members having a cylindrical contour and the surface of the other member being provided with rounded sockets opening radially toward said first named surface, an actuator member pivoted coaxially of said fixed and rotative members, a set of sprags each having a rounded radial end portion and an opposite radial wedging portion, said portions being respectively disposed in sockets of said surface of said other member and in engagement with said surface of said one member, spring means urging different sprags of the set in opposite directions in the sockets thereof for wedging engagement with said surface of said one member to prevent rotative movement of said rotative member, said actuator member having elements fixed thereon and engageable with corresponding sprags of the set upon pivotal movement of the actuator member relative to the fixed and rotative members, thus to tilt said sprags in said sockets and out of said wedging engagement with said surface of said one member and permit said rotative movement of said rotative member, and means operating said actuator member with a mechanical advantage to facilitate said last named tilting of the sprags, comprising an operator mounted for rotation coaxially of said fixed and rotative members.

3. A control device of the type described comprising a fixed locking member, a rotative member, said members having generally coaxial annular surfaces in axially telescoped, radially spaced relation to one another, the surface of one of said members having a cylindrical contour and the surface of the other member being provided with rounded sockets opening radially toward said first named surface, an actuator member pivoted coaxially of said fixed and rotative members, a set of sprags each having a rounded radial end portion and an opposite radial wedging portion, said portion being respectively disposed in sockets of said surface of said other member and in engagement with said surface of said one member, spring means urging different sprags of the set in opposite directions in the sockets thereof for wedging engagement with said surface of said one member to prevent rotative movement of said rotative member, said actuator member having elements fixed thereon and engageable with corresponding sprags of the set upon pivotal movement of the actuator member relative to the fixed and rotative members, thus to tilt said sprags in said sockets and out of said wedging engagement with said surface of said one member and permit said rotative movement of said rotative member, and means operating said actuator member with a mechanical advantage to facilitate said last named tilting of the sprags, comprising an operator mounted for rotation coaxially of said fixed and rotative members, and means connecting said operator in fulcruming engagement with one of said fixed and rotative members at a predetermined moment arm distance from the point of operation of said operator, said last named means having operating engagement with said actuator member at a substantially lesser distance from its said point of fulcruming engagement than the first named distance, thus to pivot said actuator member and its elements and thereby tilt said sprags under a mechanical advantage represented by the quotient of the last named distance into said first named distance.

4. A control device in accordance with claim 1, in which said fixed locking member has said surface of cylindrical contour and said rotative member has said sockets.

5. A control device in accordance with claim 2, in which said fixed locking member has said surface of cylindrical contour and said rotative member has said sockets.

6. A control device in accordance with claim 3, in which said fixed locking member has said surface of cylindrical contour and said rotative member has said sockets.

7. A control device in accordance with claim 3, in which said fixed locking member has said surface of cylindrical contour and said rotative member has said sockets, said connecting means comprising at least one lever fulcrumed on said rotative member and in operated and operating engagement with said operator and actuator member, respectively.

8. An anti-reverse feed-back power transmitting device comprising a fixed locking member, a rotative driven member, said members having coaxial, radially facing annular surfaces in axially telescoped, radially spaced relation to one another, the surface of said fixed member being cylindrical and the surface of the driven member being provided with rounded sockets opening radially toward said cylindrical surface, an actuator member pivoted coaxially of said fixed and driven members, a rotative driving member to drive said driven member through said actuator member, a set of sprags each having a rounded radial end portion and an opposite radial wedging portion, said portions being respectively disposed in said sockets and in engagement with said cylindrical surface, spring means urging different sprags of the set in opposite directions in the sockets thereof for wedging engagement with said cylindrical surface to prevent rotation of said driven member, said actuator member having elements engageable with corresponding sprags of the set upon pivotal movement of the actuator member relative to the fixed and driven members, thus to tilt said sprags in the sockets thereof and out of wedging engagement with said cylindrical surface and to permit said rotative movement of said rotative member, said elements of said actuator member being then engageable with said sprags to rotate said driven member through the sockets of the latter, and means operating said actuator member from said driving member with a mechanical advantage to facilitate said last named tilting of the sprags.

9. An anti-reverse feed-back power transmitting device comprising a fixed locking member, a rotative driven member, said members having coaxial, radially facing annular surfaces in axially telescoped, radially spaced relation to one another, the surface of said fixed member being cylindrical and the surface of the driven member being provided with rounded sockets opening radially toward said cylindrical surface, an actuator member pivoted coaxially of said fixed and driven members, a rotative driving member to drive said driven member through said actuator member, a set of sprags each having a rounded radial end portion and an opposite radial wedging portion, said portions being respectively disposed in said sockets and in engagement with said cylindrical surface, spring means urging different sprags of the set in opposite directions in the sockets thereof for wedging engagement with said cylindrical surface to prevent rotation of said driven member, said actuator member having elements engageable with corresponding sprags of the set upon pivotal movement of the actuator member relative to the fixed and driven members, thus to tilt said sprags in the sockets thereof and out of wedging engagement with said cylindrical surface and to permit said rotative movement of said rotative member, said elements of said actuator member being then engageable with said sprags to rotate said driven member through the sockets of the latter, and means operating said actuator member from said driving member with a mechanical advantage to facilitate said last named tilting of the sprags, comprising means operatively connected to said driving member and in fulcruming engagement with said driven member at a predetermined moment arm distance from the operative connection of said last named means to said driving member, said last named means having operating engagement with said actuator member at a substantially lesser moment arm distance from its said point of fulcruming engagement than the first named distance, thus enabling said driving member and means to pivot said actuator member and its elements and thereby tilt said sprags under a mechanical advantage represented by the quotient of the last named distance into said first named distance, said elements then engaging the sprags to drive the driven member from said driving member.

10. An anti-reverse feed-back power transmitting device comprising a fixed locking member, a rotative driven member, said members having coaxial, radially facing annular surfaces in axially telescoped, radially spaced relation to one another, the surface of said fixed member being cylindrical and the surface of the driven member being provided with rounded sockets opening radially toward said cylindrical surface, an actuator member pivoted coaxially of said fixed and driven members, a rotative driving member to drive said driven member through said actuator member, a set of sprags each having a rounded radial end portion and an opposite radial wedging portion, said portion being respectively disposed in said sockets and in engagement with said cylindrical surface, spring means urging different sprags of the set in opposite directions in the sockets thereof for wedging engagement with said cylindrical surface to prevent rotation of said driven member, said actuator member having elements engageable with corresponding sprags of the set upon pivotal movement of the actuator member relative to the fixed and driven members, thus to tilt said sprags in the sockets thereof and out of wedging engagement with said cylindrical surface and to permit said rotative movement of said rotative member, said elements of said actuator member being then engageable with said sprags to rotate said driven member through the sockets of the latter, and means operating said actuator member from said driving member with a mechanical advantage to facilitate said last named tilting of the sprags, comprising means operatively connected to said driving member and in fulcruming engagement with said driven member at a predetermined moment arm distance from the operative connection of said last named means to said driving member, said last named means having operating engagement with said actuator member at a substantially lesser moment arm distance from its said point of fulcruming engagement than the first named distance, thus enabling said driving member and means to pivot said actuator member and its elements and thereby tilt said sprags under a mechanical advantage represented by the quotient of the last named distance into said first named distance, said elements then engaging the sprags to drive the driven member from said driving member, said connecting means comprising at least one lever fulcrumed on said driven member and in operated and operating engagement with said driving and actuator members, respectively.

11. An anti-reverse feed-back power transmitting device comprising a fixed locking member, a rotative driven member, said members having coaxial, radially facing annular surfaces in axially telescoped, radially spaced relation to one another, the surface of said fixed member being cylindrical and the surface of the driven member being provided with rounded sockets opening radially toward said cylindrical surface, an actuator member pivoted coaxially of said fixed and driven members, a rotative driving member to drive said driven member through said actuator member, a set of sprags each having a rounded radial end portion and an opposite radial wedging portion, said portions being respectively disposed in said sockets and in engagement with said cylindrical surface, spring means urging different sprags of the set in opposite directions in the sockets thereof for wedging engagement with said cylindrical surface to prevent rotation of said driven member, said actuator member having elements fixed thereon and engageable with corresponding sprags of the set upon pivotal movement of the actuator member relative to the fixed and driven members, thus to tilt said sprags in the sockets thereof and out of wedging engagement with said cylindrical surface and to permit said rotative movement of said rotative member, said elements of said actuator member being then engageable with said sprags to rotate said driven member through the sockets of the latter, and means operating said actuator member from said driving member with a mechanical advantage to facilitate said last named tilting of the sprags.

References Cited in the file of this patent
UNITED STATES PATENTS

| | | |
|---|---|---|
| 1,942,472 | Craw | Jan. 9, 1934 |
| 2,559,960 | Honplain | July 10, 1951 |
| 2,812,044 | Cole | Nov. 5, 1957 |